US012620219B2

(12) United States Patent
Becher et al.

(10) Patent No.: US 12,620,219 B2
(45) Date of Patent: May 5, 2026

(54) METHOD AND ASSISTANCE SYSTEM FOR CHECKING SAMPLES FOR DEFECTS

(71) Applicant: Siemens Aktiengesellschaft, Munich (DE)

(72) Inventors: Silvio Becher, Munich (DE); Felix Buggenthin, Munich (DE); Johannes Kehrer, Munich (DE); Ingo Thon, Grasbrunn (DE); Stefan Hagen Weber, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 321 days.

(21) Appl. No.: 17/781,761

(22) PCT Filed: Nov. 16, 2020

(86) PCT No.: PCT/EP2020/082279
§ 371 (c)(1),
(2) Date: Jun. 2, 2022

(87) PCT Pub. No.: WO2021/115734
PCT Pub. Date: Jun. 17, 2021

(65) Prior Publication Data
US 2023/0021099 A1     Jan. 19, 2023

(30) Foreign Application Priority Data
Dec. 9, 2019     (EP) ..................................... 19214373

(51) Int. Cl.
*G06V 10/98*          (2022.01)
*G06T 7/00*           (2017.01)
(Continued)

(52) U.S. Cl.
CPC .......... *G06V 10/987* (2022.01); *G06T 7/0004* (2013.01); *G06V 10/764* (2022.01);
(Continued)

(58) Field of Classification Search
CPC . G06T 2207/20081; G06T 2207/30164; G06T 7/0004; G06V 10/764; G06V 10/7788; G06V 10/987; G06V 2201/06
See application file for complete search history.

(56) References Cited

U.S. PATENT DOCUMENTS

| | | | |
|---|---|---|---|
| 8,611,675 B2 | 12/2013 | Chow et al. | |
| 9,020,237 B2 | 4/2015 | Hirai et al. | |
| 2013/0222574 A1* | 8/2013 | Nakagaki | G06T 7/0004 348/125 |

FOREIGN PATENT DOCUMENTS

| | | | | |
|---|---|---|---|---|
| EP | 2277143 A2 | 1/2011 | | |
| WO | WO-2018134286 A1* | 7/2018 | | G03F 7/7065 |

OTHER PUBLICATIONS

Phil Legg et al. "Visual analytics for collaborative human-machine confidence in human-centric active learning tasks" Human-Centric Computing and Information Sciences, Biomed Central Ltd, London, UK, vol. 9, No. 1, Feb. 14, 2019 (Feb. 14, 2019), pp. 1-25; DOI: 10.1186/SI3673-019-0167-8; XP021271200.
(Continued)

*Primary Examiner* — Ruiping Li
(74) *Attorney, Agent, or Firm* — Schmeiser, Olsen & Watts LLP

(57) ABSTRACT
A method for checking samples for defects is provided, in which image data of the samples are recorded and classified into predeterminable defect categories by a defect detection algorithm, and the samples classified into a defect category are represented in a multi-dimensional confusion matrix as a classification result of the defect detection algorithm, characterized in that miniature images which reproduce the
(Continued)

image data are assigned according to the classified defect categories of the image data to segments of the confusion matrix which represent the defect categories, and these miniature images are displayed visually, the miniature image is assigned by an interaction with a user or a software robot to a different segment from the assigned segment of the confusion matrix, and is either provided as training image data for the defect detection algorithm or is output as training image data for the defect detection algorithm.

11 Claims, 4 Drawing Sheets

(51) Int. Cl.
G06V 10/764 (2022.01)
G06V 10/778 (2022.01)

(52) U.S. Cl.
CPC .................... G06V 10/7788 (2022.01); *G06T 2207/20081* (2013.01); *G06T 2207/30164* (2013.01)

(56) References Cited

OTHER PUBLICATIONS

Anonymous. "Maschinelles Sehen—Wikipedia" Sep. 10, 2019 (Sep. 10, 2019). Retrieved from the Internet: https://web.archive.org/web/2019091115003/https://de.wikipedia.org/wiki/Maschinelles_Sehen [retrieved on May 14, 2020] XP055695527; the whole document.
PCT International Search Report and Written Opinion of International Searching Authority mailed Feb. 24, 2021 corresponding to PCT International Application No. PCT/EP2020/082279 filed Nov. 16, 2020.

* cited by examiner

FIG 1

METHOD AND ASSISTANCE SYSTEM FOR CHECKING SAMPLES FOR DEFECTS

CROSS-REFERENCE TO RELATED APPLICATIONS

This application claims priority to PCT Application No. PCT/EP2020/082279, having a filing date of Nov. 16, 2020, which claims priority to EP Application No. 19214373.3, having a filing date of Dec. 9, 2019, the entire contents both of which are hereby incorporated by reference.

FIELD OF TECHNOLOGY

The following relates to a method for checking samples for defectiveness, to an assistance system for checking samples for defectiveness, and to a computer program product.

BACKGROUND

In industrial production and manufacturing, machine learning methods are being used more and more often in order to be able to take automated decisions. One example here is the application of classification methods to recorded image data of samples, which can represent produced parts, in order to assess the quality of the samples and to sort out faulty or defective samples. The recorded image data are assigned to different classes on the basis of common features (e.g. "part OK", "dispose of part", "rework necessary"). A further application example is the classification of time series data from sensors. In this case, a time series is interpreted as a sample that ultimately also supplies data. The time series are classified with the aid of an algorithm (e.g. "normal", "start up machine", "wear too high", "abnormal operating state"). On the basis of the result of the classification algorithm, actions can be derived, e.g. stopping the machine, arranging inspection, exchanging tools or adapting machine parameters. The classification is effected with the aid of a classification or defect recognition algorithm, e.g. neural network, support vector machine, etc. In the present case, defectiveness is understood to mean not only the fault or defect on the sample itself, but also a "defective" classification. By way of example, the classification should have been "abnormal operating state" instead of "start up machine".

It is possible to use the following methods:

batch labeling: a group of data acquire the same label, without the individual data being viewed. In this case, groups are formed which, with high probability, include exclusively members of one class (e.g. all data from normal operation without incidents).

individual labeling: data points are presented successively to an expert for assessment. This is usually done without direct supporting context information (e.g. visualization of all assignments) with respect to the other classes.

In the case of classification or defect recognition algorithms, it is customary for the learnt algorithm to be applied to a data set for which the correct classes are known, but which itself would not be used for the training of the algorithm. The result of the algorithm can thus be compared with the so-called ground truth. Metrics, such as e.g. precision, hit rate, accuracy or F-score, give indications about the quality of the algorithm. One conventional presentation here is the confusion matrix, in which the number of correctly or incorrectly classified data can be read.

Examples of confusion matrices are known from the patent publications U.S. Pat. No. 9,020,237 B2, U.S. Pat. No. 8,611,675 B2, EP 2277143 A2.

In this case, the evaluator obtains a quantitative understanding of the quality of the algorithm. For a domain expert, however, it is essential to consider the associated images/time series in detail in order to acquire deeper insights about why the data were classified incorrectly or correctly.

It is possible for the unknown or unclassified image data to be presented clearly to a domain expert in order to classify the image data themselves. An initial training set is obtained with the classified image data.

In order to be able to assess the prediction quality of the classification or defect recognition algorithm, an evaluation of the algorithm after the training phase is expedient. However, it is often difficult to decide whether the quality of the classification is sufficient. Moreover, the evaluation is often not carried out by the developer of the classification or defect recognition algorithm, who has the mathematical background, but rather by domain experts. The latter usually have the expertise themselves semantically to understand the images or image data from samples or else time series, to classify them and to compare their knowledge with the results of the defect recognition algorithm. In this case, samples can be various parts that may need to be produced, e.g. housing, screw, gearwheel, etc. Objects such as e.g. blood cells, in medicine are also conceivable, which can be recognized according to their type and correspondingly classified. For this purpose, the image data have to be clearly presented to the evaluator with their respective classification. It is only with the expert's domain knowledge that the defect recognition algorithm can be evaluated and improved. The optimized defect recognition algorithm can then be used in an automated manner in the industrial process.

During ongoing operation, a domain expert has to be able to recognize data classified incorrectly by the algorithm. The domain expert can then report these data with the correct label back to the algorithm. The model is continuously improved as a result.

The problem to be solved is therefore that of enabling a domain expert as well as possible to initially label or classify data, to assess the quality of the algorithm, and to monitor it during ongoing operation, even though the defect recognition algorithm is often a "black box" for the domain expert.

SUMMARY

Consequently, an aspect relates to improve the checking of samples for defectiveness or correct classification.

In this regard, embodiments of the invention are directed to a method for checking samples for defectiveness, in which image data of the samples to be checked are recorded and the image data associated with the samples are classified into predefinable defect categories by means of a defect recognition algorithm, wherein a number of the samples classified into a defect category, optionally according to a rank order, are presented in a multidimensional confusion matrix as a classification result of the defect recognition algorithm, miniature images which reproduce the image data associated with the samples are assigned, according to the classified defect categories of the image data, to segments of the confusion matrix which represent the defect categories, and said miniature images are presented visually, in particular within the segments, the miniature image, by way of an interaction with a user or a software robot, also called bot, is assigned into a different segment than the assigned segment of the confusion matrix and in this case either is provided as training image data for the defect recognition algorithm or is provided and output as training image data for the defect recognition algorithm.

These methods can—as described in the introduction—be used or carried out initially, and/or for evaluating the assignment and/or during the operating time. The defect categories can describe both the number and the type of the defect. It is possible to designate a defect category as "unknown" or "not classified", particularly if the defect recognition algorithm is executed initially.

If the confusion matrix is configured in a two-dimensional fashion, then the defect categories of the user or domain expert or evaluator, optionally arranged in a rank order, can be plotted on the horizontal axis. Initially either the category "not classified" and/or the defect categories optionally sorted in a rank order of the defect algorithm can be found on the vertical axis.

A correspondence between the result of the defect algorithm and that of the user or optionally bot can then usually be found on the diagonal of the confusion matrix.

In one possible application in robot-controlled process automation, software robots, also called bots, perform the roles and tasks of users and interact with other software systems. Contrary to a first reflexive assumption, however, software robots are not physically existing machines such as are known from manufacturing industry. Rather, they are software applications which imitate and thus automate a human interaction with user interfaces of software systems. Possible Embodiments of the Invention are:

The size of the miniature images can be adapted such that the miniature images assigned to a segment optically fit into the segment.

In the confusion matrix, the size of the miniature image can be individually adapted after selection of said miniature image, e.g. by way of zoom, magnifying glass/fish eye, new windowing, etc.

The number of miniature images within a matrix segment can be optically identified, e.g. by way of the display of a number by means of mouse selection or color/color depth within a predefinable quantitative interval.

The miniature images can be positioned within a (matrix) segment of the confusion matrix in a manner sorted according to at least one predefinable criterion, wherein the criterion can be: label, and/or probability of the correct classification, entropy over all defect categories, dimension reduction, similarity or distance metric, random, etc. The assignment of one or more miniature images from a classified segment into a different segment of the confusion matrix can be carried out by way of comparison of selected or selectable miniature image regions on the basis of the at least one criterion.

The application of the method explained above entails the following advantages:

As a result of the clear presentation in a "pictorial" confusion matrix, defects can be visually recognized efficiently and reliably as soon as miniature images of the samples are embedded in the confusion matrix. Further indicators can easily be identified visually, e.g.

1. The arrangement of the miniature images within a matrix segment according to the probability of being assigned in the "correct" defect category, or other criteria.

2. The size of the miniature images is adapted to the respective segment.
3. Background color of the segments can indicate further information.
4. Images can be magnified interactively (magnifying lens within the matrix, image magnification outside the matrix).
5. Link between miniature image and magnified image by means of visual highlighting.
6. Marking of the relevant regions in the images.
7. Change of the correct classification by means of drag and drop within a matrix column.
8. Parameter changes result in an updating of the visualization.

A further aspect of embodiments of the invention relates to an assistance system for checking samples for defectiveness by means of a defect recognition device, which records image data of the samples to be checked and classifies the image data associated with the samples into predefinable defect categories by means of a defect recognition algorithm, wherein a number of the samples classified in the defect categories are presentable in a multi-dimensional confusion matrix as a classification result of the defect recognition algorithm, and which defect recognition device comprises at least one processing unit having at least one storage unit, wherein the processing unit is configured to assign miniature images which reproduce the image data associated with the samples, according to the classified defect categories of the image data, to segments of the confusion matrix which represent the defect categories, and to present said miniature images visually, in particular within the segments, to assign the miniature image, by way of an interaction with a user or a software robot, also called bot, into a different segment than the stated segment of the confusion matrix and in this case either to provide said miniature image as training image data for the defect recognition algorithm in the at least one storage unit or to provide said miniature image as training image data for the defect recognition algorithm in the at least one storage unit and to output it at an output unit, for example a display or tablet, etc.

The assignment to the segments can be carried out or performed by an evaluation unit. The units mentioned above can be embodied in terms of hardware, firmware and software.

Developments and embodiments concerning the method explained above are analogously applicable to the assistance system or apparatus.

In a further aspect, embodiments of the invention relate to a computer program product (non-transitory computer readable storage medium having instructions, which when executed by a processor, perform actions) comprising a non-transitory computer-readable medium, which is loadable directly into a memory of a digital computer, comprising program code parts suitable for carrying out the steps of the method described.

Unless indicated otherwise in the following description, the terms "reproduce", "simulate", "receive", "apply", "output", "provide" and the like relate to actions and/or processes and/or processing steps which alter and/or generate data and/or convert the data into other data, wherein the data can be represented or present in particular as physical variables.

In association with embodiments of the invention, a processor can be understood to mean for example a computer, a machine or an electronic circuit. Moreover, a processor can be understood to mean a virtualized processor embodied for example in a server shared by many users, also referred to as cloud. A respective "unit", for example the reproduction unit or simulation unit, can be implemented using hardware technology and/or else software technology. In the case of an implementation using hardware technology, the respective unit can be embodied as an apparatus or as part of an apparatus, for example as a computer, as part of a computer, such as, for example, a graphics card, or as a microprocessor. In the case of an implementation using software technology, the respective unit can be embodied as a computer program product, as a function, as a routine, as part of a program code or as an executable object.

A computer program product can be provided or supplied for example as a storage medium, such as, for example, a memory card, USB stick, CD-ROM, DVD, or else in the form of a downloadable file from a server in a network.

BRIEF DESCRIPTION

Some of the embodiments will be described in detail, with reference to the following figures, wherein like designations denote like members, wherein:

FIG. 1 shows one exemplary embodiment of the method according to the invention as a flow diagram;

DETAILED DESCRIPTION

Figures 6, 7:
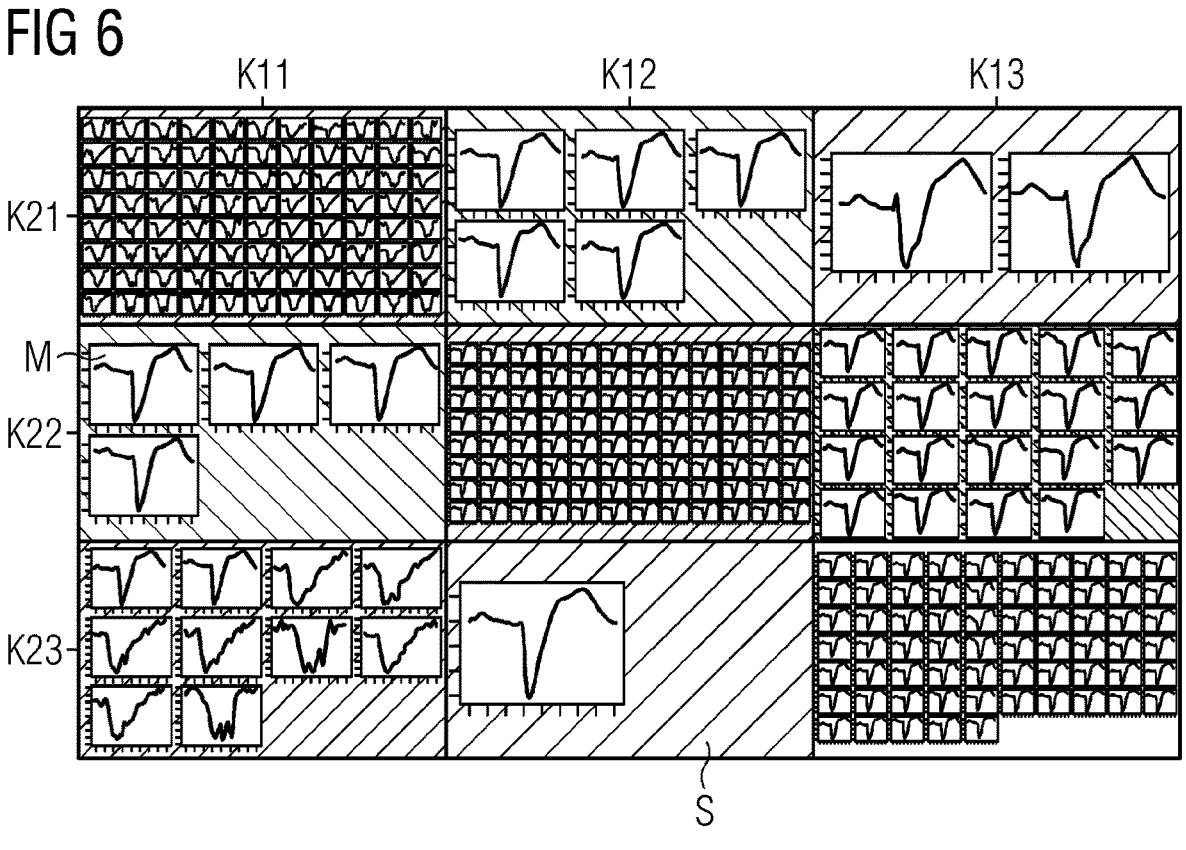
FIG. 6 shows a confusion matrix with time series data originating from a sensor.
FIG. 7 shows a manufacturing environment by way of example.

FIG. 7 shows a manufacturing environment. An assistance system A comprising a processing unit, e.g. a processor, and at least one storage unit can be used in a manufacturing environment for example in order to assist or carry out the following steps. In step 1, a defect recognition device (not illustrated), which can also be embodied as an edge device, can set up a connection to the assistance system A or can be integrated into the assistance system in some other way. In step 2, a camera or some other image recording device is connected to the defect recognition device. The classification result of a defect recognition algorithm can be displayed to a user B on an output apparatus e.g. in the form of a display D arranged close to a manufacturing machine F.

Figure 1:
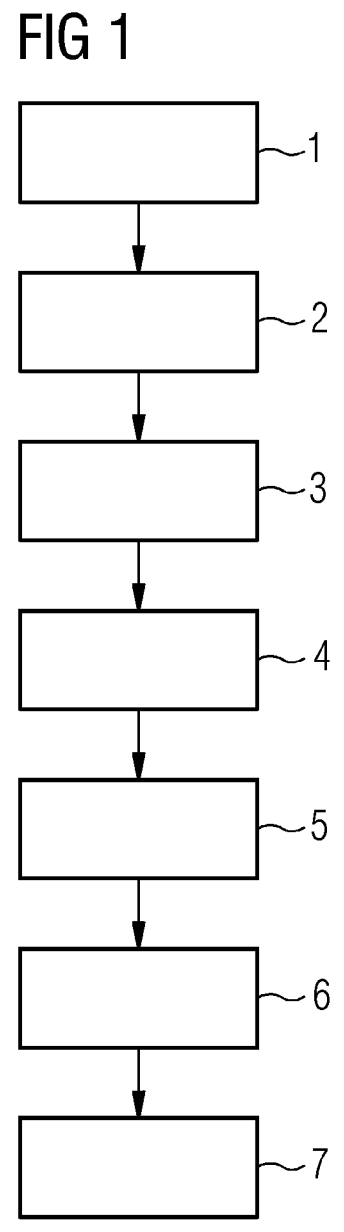

FIG. 1 shows a flow diagram concerning the procedure according to embodiments of the invention, the steps being designated by 1 to 7.

Figure 2:
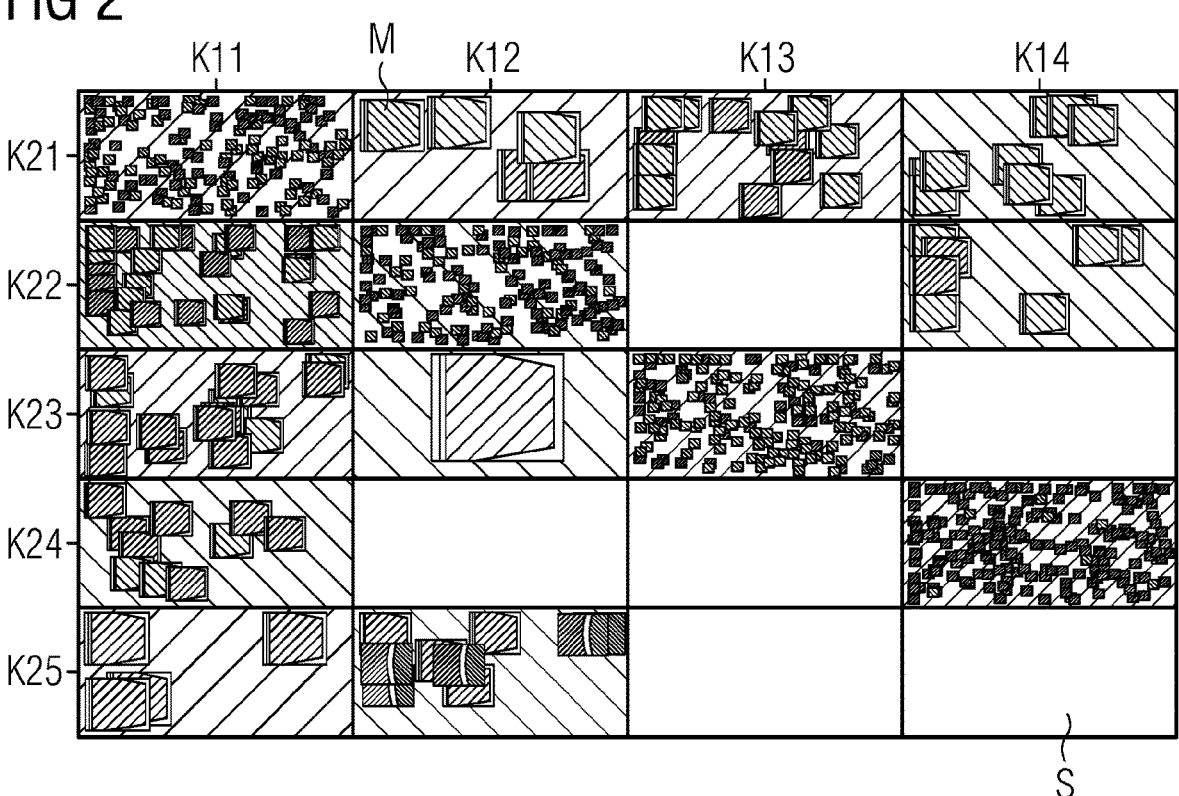
FIG. 2 shows an embodiment of a confusion matrix, in the segments of which miniature image are presented virtually.
Figure 3:
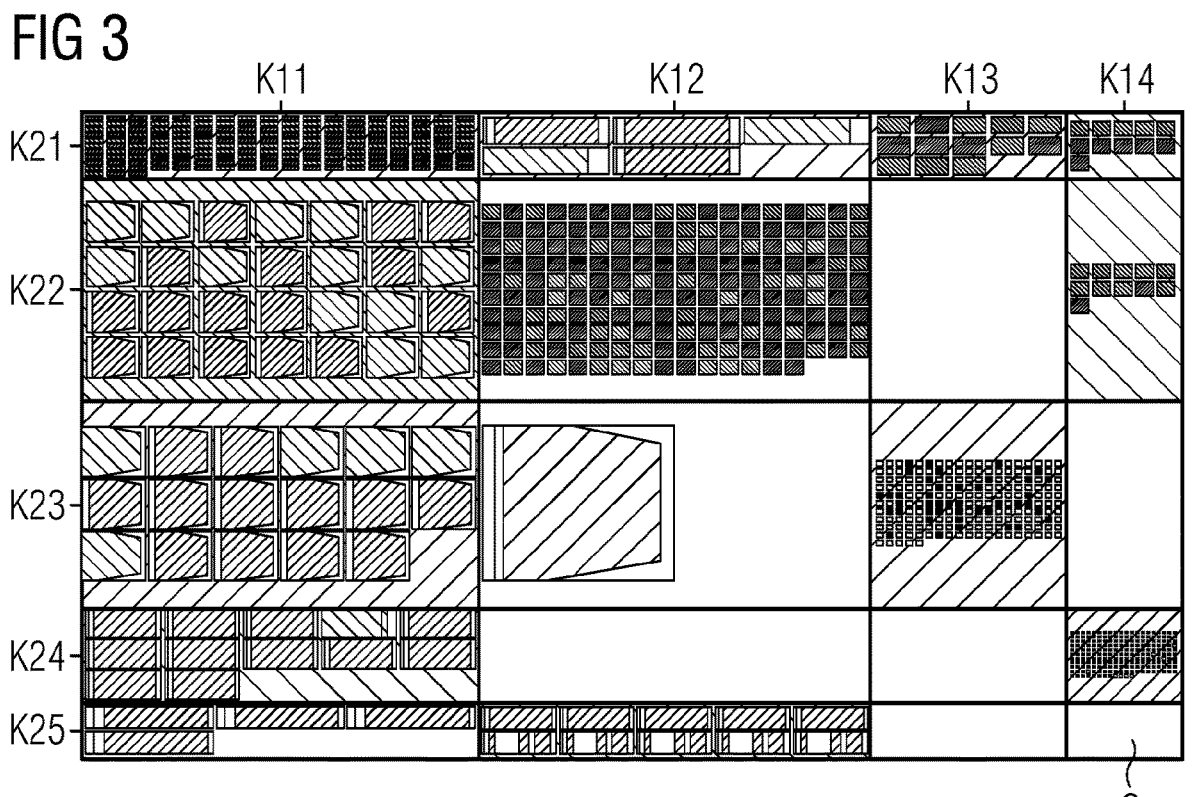
FIG. 3 shows an embodiment of a confusion matrix, in the segments of which miniature image are presented virtually.
Figure 4:
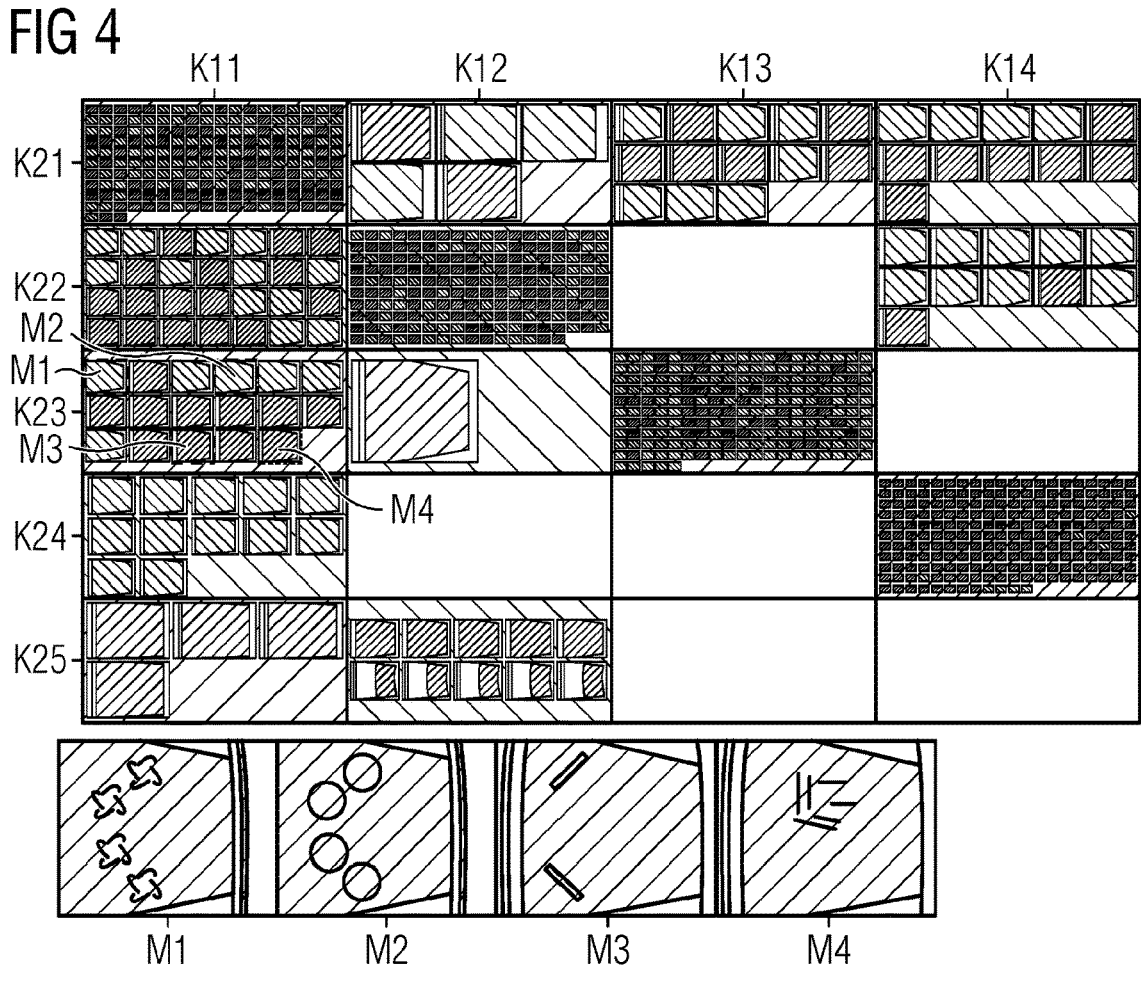
FIG. 4 shows an embodiment of a confusion matrix, in the segments of which miniature image are presented virtually.
Figure 5:
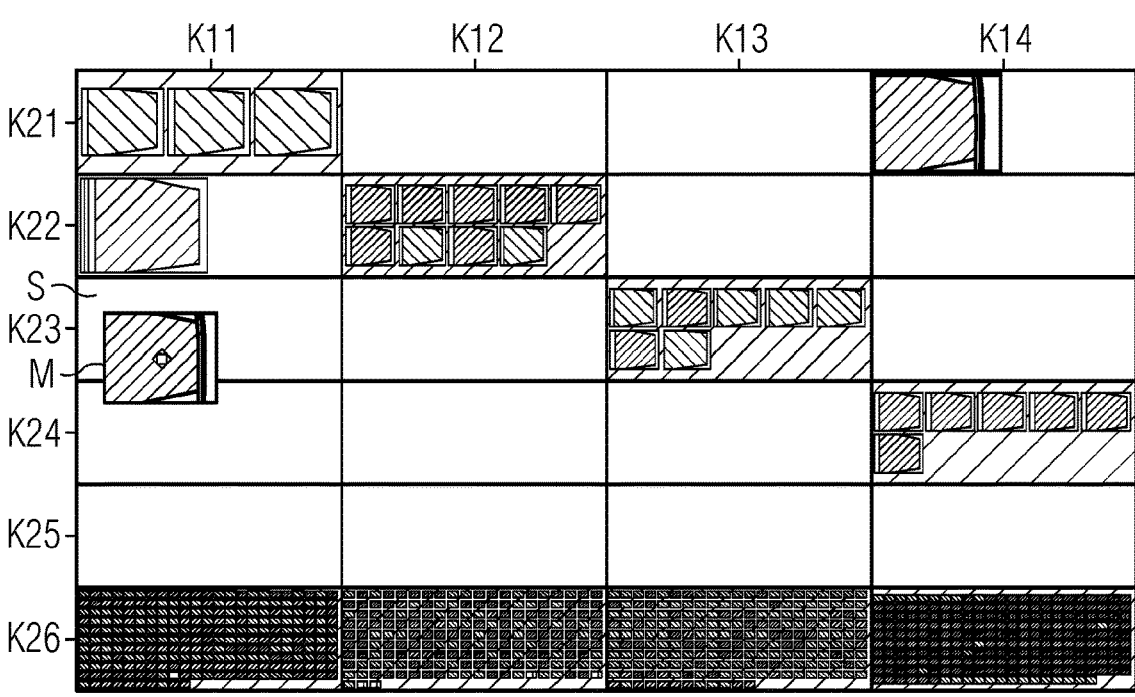
FIG. 5 shows an embodiment of a confusion matrix, in the segments of which miniature images are presented visually.

In step 3, a training mode can be started, in which the defect recognition algorithm, which can be configured in the form of an intelligent learning algorithm, e.g. a neural network, conducts a data classification. In the example, the user or a bot supplies marked image data recorded from a sample, which are classified or allocated into a predefinable defect category. According to embodiments of the invention, a multi-dimensional confusion matrix is used, defect categories—optionally sorted in a rank order—being plotted on each axis or dimension. By way of example, in accordance with FIG. 1, the defect categories designated there by K11 to K14 may read as follows, for example: "increased area", "defects/holes in the material", "segment missing" and "normal". The vertical y-axis would then be assignable to the user. The defect categories K11 to K15 with "increased area", "defects/holes in the material", "segment missing" and "normal" are arranged on the horizontal x-axis, with defect category K14 additionally representing "others" or "not classified" or "unknown". The vertical y-axis would be an initial starting solution for the defect recognition algorithm or would already be a defect classification result if the defect algorithm has previously been executed once already. The image data, in the form of miniature images M of the respective samples, are assigned to the segments of the confusion matrix and presented visually. In FIGS. 2, 3 and 5, one of the many miniature images is designated by M. In FIG. 4, the miniature images M1, M2, M3, M4 are indicated as being presented with a box around them and correspondingly magnified and arranged below the confusion matrix, in which case these miniature images can be shown in a separate window or a separate display. A correspondence between the result of the defect algorithm and that of the user or optionally bot can then be found on the diagonal of the confusion matrix. The miniature images which, by way of an interaction with the user B or bot, are assigned into a different segment than the assigned segment of the confusion matrix are provided as training image data for the defect recognition algorithm in the at least one storage unit and/or are output at an output unit, e.g. display D.

If present, an already pretrained model can be used for the defect algorithm in step 4. Said pretrained model could be represented with defect categories possibly by way of a further z-axis in the depth.

In step 5, a training of the defect recognition algorithm with the aid of the content of the confusion matrix or training image data is carried out, and in step 6 the trained model is introduced into the defect recognition unit. In step 7, finally, samples can be checked for defectiveness by means of the defect recognition device while a manufacturing machine F is running (online) or after the manufacturing process (post-processing).

FIGS. 2 to 6 show various embodiments of a confusion matrix. In the example, said confusion matrix is of two-dimensional design. The image data associated with a sample form a miniature image (referred to as: thumbnails) and are assigned, according to their classified defect category K11 to K26 of a segment S representing the defect category, to the confusion matrix and are presented visually.

In FIGS. 2 to 6, the size of the miniature images is adapted such that the miniature images assigned to a segment optically fit into the segment. In this case, the miniature images can lie in a segment without being sorted—as shown in FIG. 2—or they are arranged in the segment in a manner sorted according to a specific criterion—as is evident in FIGS. 3 to 5. One possible criterion is the probability (see e.g. FIG. 3: 0.94) of the association with this defect category, also referred to as a confidence factor. Other criteria are conceivable, such as e.g. entropy over all defect categories, dimension reduction, similarity or distance metric, random, etc.

FIG. 4 indicates that a miniature image M, by way of an interaction (e.g. "drag and drop" using the mouse or selection with the aid of lasso tools, etc.) with a user or bot, can be assigned into a different segment than the assigned segment S of the confusion matrix. The assignment of one or more miniature images from an assigned or classified segment into a different segment of the confusion matrix can be carried out by way of comparison of selected or selectable miniature image regions on the basis of at least one criterion. Such a criterion can be a poor confidence value, similar brightness of the image, visually similar shape of the samples, recognizable defects such as welding spatter, scratches, etc.

Particularly miniature images M which are initially assigned to the defect category "not classified" or could not be assigned by the defect recognition algorithm and are therefore in the defect category "unknown" are assignable to one of the other defect categories by the user. The defect categories on an axis of the confusion matrix can be arranged according to a predefinable rank order.

Various background hatchings of the segments of the confusion matrix are discernible in FIGS. 2 to 6. The number of miniature images within a segment can thus be optically identified. These hatchings, e.g. "close spacing of the lines" (=dark) and "wide spacing of the lines" (=light) can represent t different lightness levels of a color. By way of example, the color "green"—for example in FIG. 5 in the segments (K11;21), (K12;K22), (K13; K23), (K14; K24)— would indicate that the miniature images shown in this segment are correctly assigned or classified. "Dark green" could indicate that a high number (within a predefinable interval) of miniature images are assigned correctly. The number of correctly assigned miniature images within a segment decreases with gradation to "light green". The color "blue"—e.g. in FIG. 5 in segments (K13; K21), (K14; K21), (K14; K22), (K11; K23), (K11; K24), (K12; K25)—with its lightness gradations analogous to "green" could indicate that the miniature images within this segment are not correctly assigned. A color "purple" could represent a kind of "intermediate level" between correctly assigned miniature images and non-correctly (incorrectly) assigned miniature images. Other color combinations are also conceivable. Likewise, instead of a background hatching or color, the border of a segment could also be correspondingly optically identified.

FIG. 4 shows with the miniature images M1 to M4 by way of example that a selection of miniature images can be magnified. Magnifying techniques such as fish eye, magnifying glass, zoom, new window or presentation on a different display are possible for this purpose.

FIG. 6 shows a confusion matrix in which time series data from sensors are classified. In this regard, instead of an image recording device, sensors can also supply data which are presented visually in the confusion matrix. A time series is interpreted as a sample in this case. Embodiments mentioned above can be applied to this confusion matrix as well.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for checking samples for defectiveness, the method comprising:
    recording image data of the samples to be checked;
    classifying the image data associated with the samples into predefinable defect categories by a defect recognition algorithm;
    presenting a number of the samples classified in the predefinable defect categories in a multi-dimensional confusion matrix as a classification result of the defect recognition algorithm;

assigning miniature images which reproduce the image data associated with the samples according to the predefinable defect categories of the image data, to segments of the multi-dimensional confusion matrix which represent the predefinable defect categories, wherein the miniature images are presented visually within the segments, and, as a function of the assigning the miniature images, a size of the miniature images is adapted to optically fit into the segment, wherein each miniature image is a thumbnail representation of image data of a respective sample that is visually embedded within a matrix segment corresponding to the classified defect category of the respective sample, wherein the multi-dimensional confusion matrix comprises a first axis representing defect categories classified by the defect recognition algorithm and a second axis representing defect categories assigned by a user or software robot, and wherein the miniature images are visually embedded within individual matrix segments defined by intersections of the first axis and the second axis;
    assigning, by way of an interaction with a user or a software robot, a miniature image into a different segment than the assigned segment of the multi-dimensional confusion matrix, which is either provided as training image data for the defect recognition algorithm or is provided and output as training image data for the defect recognition algorithm, wherein the assigning comprises dragging and dropping the miniature image from one matrix segment to another matrix segment within the multi-dimensional confusion matrix.

2. The method as claimed in claim 1, wherein a size of the miniature image is individually adapted after selection of the miniature image.

3. The method as claimed in claim 1, wherein a number of miniature images within a segment is optically identified.

4. The method as claimed in claim 1, wherein the miniature images are positioned within a segment of the multi-dimensional confusion matrix in a manner sorted according to at least one predefinable criterion, the at least one predefinable criterion being a confidence value, an entropy over all defect categories, a dimension reduction, a similarity, or a distance metric.

5. The method as claimed in claim 1, wherein an assignment of one or more miniature images from an assigned segment into a different segment of the multi-dimensional confusion matrix is carried out by way of comparison of selected or selectable miniature image regions on a basis of the at least one criterion or on a basis of at least one further criterion including a poor confidence value, a similar image brightness, a visually similar sample shape and/or a recognizable defect.

6. An assistance system for checking samples for defectiveness by a defect recognition device, which records image data of the samples to be checked and classifies the image data associated with the samples into predefinable defect categories by a defect recognition algorithm, wherein a number of the samples classified in the defect categories are presentable in a multi-dimensional confusion matrix as a classification result of the defect recognition algorithm, the assistance system comprising:
    at least one processing unit having at least one storage unit, wherein the processing unit is configured
        to assign miniature images which reproduce the image data associated with the samples, according to the classified defect categories of the image data, to segments of the multi-dimensional confusion matrix which represent the predefinable defect categories, wherein the multi-dimensional confusion matrix comprises a first axis representing defect categories classified by the defect recognition algorithm and a second axis representing defect categories assigned by a user or software robot, and wherein the miniature images are visually embedded within individual matrix segments defined by intersections of the first axis and the second axis, and to present the miniature images visually within the segments, and, as a function of assigning the miniature images, a size of the miniature images is adapted to optically fit into the segment, wherein each miniature image is a thumbnail representation of image data of a respective sample that is visually embedded within a matrix segment corresponding to the sample's classified defect category, to assign a miniature image, by way of an interaction with a user or a software robot, into a different segment than the assigned segment of the multi-dimensional confusion matrix, wherein the assigning comprises dragging and dropping the miniature image from one matrix segment to another matrix segment within the multi-dimensional confusion matrix, either to provide the miniature image as training image data for the defect recognition algorithm in the at least one storage unit or to provide the miniature image as training image data for the defect recognition algorithm in the at least one storage unit and to output the miniature image at an output unit.

7. The apparatus as claimed claim 6, wherein the miniature images are positionable within a segment in a manner sorted according to at least one predefinable criterion.

8. The apparatus as claimed in claim 6, wherein the number of miniature images within a segment is optically identifiable.

9. A computer program product, comprising a non-transitory computer readable hardware storage device having computer readable program code stored therein, said program code executable by a processor of a computer system to implement a method as claimed in claim 1, comprising program code parts designed to carry out the method.

10. The method as claimed in claim 1, wherein the samples are checked for defectiveness while a manufacturing machine is running or after a manufacturing process.

11. The apparatus as claimed in claim 6, wherein the samples are checked for defectiveness while a manufacturing machine is running or after a manufacturing process.

* * * * *